US006187364B1

(12) United States Patent
Broberg

(10) Patent No.: US 6,187,364 B1
(45) Date of Patent: *Feb. 13, 2001

(54) ENCAPSULATION OF PASTA PRODUCT PORTIONS WITH AN EDIBLE SUBSTANCE FOR IMPROVED COOKING PROPERTIES

(75) Inventor: Lars Broberg, Jonstorp (SE)

(73) Assignee: Nestec S.A., Vevey (CH)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/092,336

(22) Filed: Jun. 5, 1998

(30) Foreign Application Priority Data

Jun. 6, 1997 (EP) .................................. 97201717

(51) Int. Cl.⁷ ..................................................... A23L 1/16
(52) U.S. Cl. ............................. 426/557; 426/94; 426/451
(58) Field of Search .................... 426/557, 451, 426/94

(56) References Cited

U.S. PATENT DOCUMENTS

| | | | |
|---|---|---|---|
| 3,798,343 | 3/1974 | Vitale | 426/502 |
| 4,418,085 | * 11/1983 | Becquelet | 426/303 |
| 4,574,690 | * 3/1986 | Chiao et al. | 426/523 |
| 5,137,737 | * 8/1992 | Kaiser et al. | 426/557 |
| 5,139,808 | * 8/1992 | Barnes et al. | 426/557 |

FOREIGN PATENT DOCUMENTS

2248541  4/1992  (GB) .

OTHER PUBLICATIONS

Marsha Hanzel, "Richmon News Leaders", p. 4, Aug. 1990.*

Food Processing Newsletter Jun. 1987.*

J.V. Ziemba, "Food Engineering" 1971.*

Anon, "International New Product Report" Jun. 1995.*

Constable, et al. (Eds.), *Fresh Ways with Pasta,* Time–Life Books Inc., Chicago, IL., U.S.A., 1986 pp. 53–54.

Database Abstract, Derwent Information Ltd., WPI Accession No. 91–144170/199120 abstract of Japanese Patent Document JP–A–03 080068, 1999.

Korn, et al. (Eds.), *Pasta,* (The Good Cook Techniques & Recipies), pp. 52–53, Time–Life Books, Inc., Chicago IL., U.S.A., 1980.

computer database document which provides a reproduction of a newspaper article by Felicia Gressette in the Maimi Herald on Oct. 12, 1989 entitled "It's Casserole Time Again . . . "

* cited by examiner

*Primary Examiner*—Lien Tran
(74) *Attorney, Agent, or Firm*—Vogt & O'Donnell, LLP

(57) ABSTRACT

Segment portions of a layered pasta product, particularly portions of a lasagne product, having layers of a filling between pasta sheet layers are prepared so that a bottom base pasta sheet surface is not coated with the filling material, and then an edible substance is applied to the product segment portions so that the portions are encapsulated by the edible substance which is one which upon heating a pasta sheet of the bottom base surface of the product on a cooking surface reduces adherence of the sheet, and hence the product, to the cooking surface, and then, the encapsulated portions are frozen.

26 Claims, 2 Drawing Sheets

ENCAPSULATION OF PASTA PRODUCT PORTIONS WITH AN EDIBLE SUBSTANCE FOR IMPROVED COOKING PROPERTIES

BACKGROUND OF THE INVENTION

The present invention relates to an alimentary product, particularly a pasta product, which includes a filling, and more particularly to a lasagne product, which is prepared and provided for cooking for preparation of a meal.

Conventionally, lasagne are made from sheets of pasta which, cooked or un-cooked, raw or dehydrated, are layered with sauce between the layers, arranged in a baking tray. Depending on the size of the tray, each pasta layer may be constituted of one or more sheets of pasta abutting or slightly overlapping. Normally, the sauce is tomato, béchamel or cheese sauce, meat and tomato sauce or a combination thereof. The layered product is then baked in an oven.

Frozen lasagne are available as a ready meal. Such products are prepared in the tray in a conventional oven or by microwave heating in a microwave oven.

A continuous lasagne production process is disclosed in our European patent EP 0 643 915 B1. In this process, strands of pasta are continuously extruded and layered with sauce so as to form lasagne. The continuous strands of lasagne are subsequently cut into lasagne of suitable size. The lasagne may be inserted into trays which provide support for storage, freezing and re-heating or baking etc. Alternatively, the lasagne may be individually frozen and then packed.

In general, when a lasagne is made by layering pasta and sauce or other filling in a tray, the sauce or other filling constitutes the bottom layer of the lasagne. In the continuous production of lasagne the bottom layer of the lasagne is a pasta sheet. For certain cooking or heating methods this may be undesirable as the pasta may tend to adhere to the tray or surface on which it is heated or baked. Furthermore, cooking or heating of said bottom pasta sheet will differ from the heating or cooking of pasta sheets abutting sauce or other filling giving a harder texture of the bottom pasta sheet.

SUMMARY OF THE INVENTION

It has surprisingly been found that it may be possible to provide an alimentary product comprising pasta and a filling, e.g. a lasagne, with an edible coating and that this coating may limit the adhering of the pasta to a cooking surface such as a baking or cooking tray, etc. For example, a sauce-coated lasagne according to the invention, may provide an easy-release product that does not stick to the cooking or baking tray in which it is heated or cooked.

Furthermore, it has been found that by providing an alimentary product comprising pasta and a filling, e.g. lasagne, the life of the product may be increased due to the preserving effect of the encapsulation. Thus, it has been found that the encapsulation may serve both the purpose of prolonging the life of the alimentary product and improve the cooking properties.

In addition, it has been observed that it may be possible to provide such an edible coating by immersing or dipping said product, e.g. a non-baked lasagne, into a liquid coating base before freezing it. The immersing or dipping may be done without any substantial escape of the filling from the filling/pasta laminate of the lasagne.

Accordingly, the invention provides an individually frozen alimentary product comprising pasta and a filling, said alimentary product includes an edible coating substantially encapsulating the pasta and filling, the coating being effective to reduce attachment between the alimentary product and a cooking surface.

The alimentary products comprising pasta and a filling are, e.g. products such as lasagne, ravioli, tortellini, cannelloni, etc., or other products wherein pasta and a filling is combined, for example, products wherein a filling is encapsulated in a pasta sheet or wherein the pasta forms an open casing for the filling or wherein the pasta sheets are layered with the filling.

The present invention also provides a process for making an alimentary product comprising pasta and a filling, comprising the steps of providing an alimentary product comprising pasta and a filling, substantially encapsulating the pasta and the filling in an edible coating which is effective to reduce attachment between the alimentary product and a cooking surface, and then the encapsulated product is frozen. Additionally, the pasta and filling product may be frozen and then coated and further frozen.

In a preferred embodiment of the invention, the edible coating is made from a liquid coating base. It is applied onto the product by immersing the product into the liquid coating. The liquid coating base is advantageously a sauce, preferably a sauce selected from the group consisting of cheese sauce and béchamel sauce with or without milk, tomato sauce and vegetable sauce, or a combination thereof. The sauce may or may not comprise pieces of meat, fish or vegetables, etc. Other sauces are sauces based on meat or fish stock or gravy. Consequently, it is possible to provide an edible coating of a sauce which is conventionally used for pasta products such as lasagne and cannelloni. The advantages of the invention may therefore be obtained without changing the taste and the recipe of the pasta product.

Conveniently, the pasta in the alimentary product is blanched pasta. However, it is possible that the pasta may be raw or dehydrated. The cooking time of the lasagne may have to be adjusted accordingly.

Generally, an amount of 100 to 400 grams of liquid coating per kilo of the alimentary product (i.e., from 10% to 40% liquid coating by weight) is sufficient, with about 200 to 400 grams per kilo (i.e., from 20% to 40% liquid coating by weight) being preferred, more preferred 300 to 400 grams (i.e., from 30% to 40% liquid coating by weight). For a 40 to 60 grams alimentary product the coating constitutes from 30 to 40% of the total weight of the product. It will be apparent that the amount of coating necessary for providing a suitable encapsulation will depend on the geometry of the product.

In order to obtain an appropriate adhering of the liquid coating base the viscosity thereof is preferably less than 2 cgr. Bostwick (60 sec at 15° C.). A preferred cheese sauce has a viscosity of 10 cgr Bostwick (60 sec at 60° C.). The freezing of the alimentary product fixes the coating.

Conveniently, the coating is from 0.5 to 5 mm thick, preferably from 1 to 3 mm thick. For certain embodiments of the invention it is preferred that the coating is 2 to 5 mm thick, more preferred 3 to 5 mm thick.

The method of providing an alimentary product according to the present invention may be particularly suitable for providing coated segments of alimentary products. Such coated segments of alimentary products may advantageously be prepared in accordance with the method of preparation described in our co-pending European patent application (and its counterpart U.S. application Ser. No. 09/092,167.) with the title "Alimentary Product With Pasta Layers" and filed on the same date as this application (European and U.S.), and the contents of the European application and of the U.S. application Ser. No. 09/092,167 are incorporated herein by reference for disclosure of preferred ways of preparing meals from coated alimentary products according to the invention. For preparation in pan, such as is disclosed in the noted European application (and its noted U.S. counterpart application) application, the weight of the lasagne segment is preferably from 20 to 80 grams, preferably from 40 to 60 grams.

It may be desirable to provide the upper surface of the segments with a browning or gratin. For this, the upper layer of lasagne is e.g. coated with a cheese or cheese sauce and passed beneath a grill or another type of heating element. Instead of such an upper cheese sauce or as a compliment thereto, a grated cheese topping may be provided. Furthermore, colouring agents may be used to enhance the colour of the top surface of the lasagne.

A particularly suitable way of providing the edible coating is by immersing the pasta with filling in a liquid coating base. This may advantageously be done by passing the product on a perforated conveyer through a batter applicator. It has been found that a conventional batter applicator may be used. The product may either be totally immersed in the liquid coating base or partly so while coating of the remaining part of the product may be done by spraying or sprinkling or by passing the product through a running film or curtain of the liquid coating base. Alternatively, the full coating may be done by spraying the liquid coating base onto the product, e.g. in a conventional spraying tunnel. Additionally, a thicker coating may be obtained by repeating the coating process.

In some instances it may be desirable that the pastas with the filling are individually frozen before the coating in the liquid coating base. If the product to be coated is frozen, a tumble coater may be used for the application of the edible coating.

A convenient way of continuously producing a layered alimentary product comprising pasta and a filling is described in our European patent EP 0 643 915.

In general, it is desirable that the pasta is blanched. This reduces the cooking time necessary for preparing the alimentary product for eating.

In order to improve the adhering of the liquid coating base to the pasta and filling it may be desirable to subject the pasta with filling to a dusting step before being coated with the edible coating. However, when blanched pasta is used, such a dusting step may not be necessary. For the dusting of conventional products for such a use, e.g. flour, bread crumbs, etc., may be applied. If dusting is used, a more low viscous coating may be used.

It has been found that the alimentary product as above described may advantageously be used for a method of preparing an alimentary product wherein a plurality of frozen alimentary products are arranged in a pan, a cooking liquid is added to the pan, and the alimentary products and the cooking liquid are heated. By arranging the individual segments of lasagne coating in accordance with the present invention, the segment may, after heating, form one unit of lasagne. The cooking liquid is e.g. water, bouillon, stock, etc.

The invention is explained in further detail by example only, with reference to the accompanying drawings and the examples below.

DETAILED DESCRIPTION OF THE DRAWING FIGURES

Figure 1:
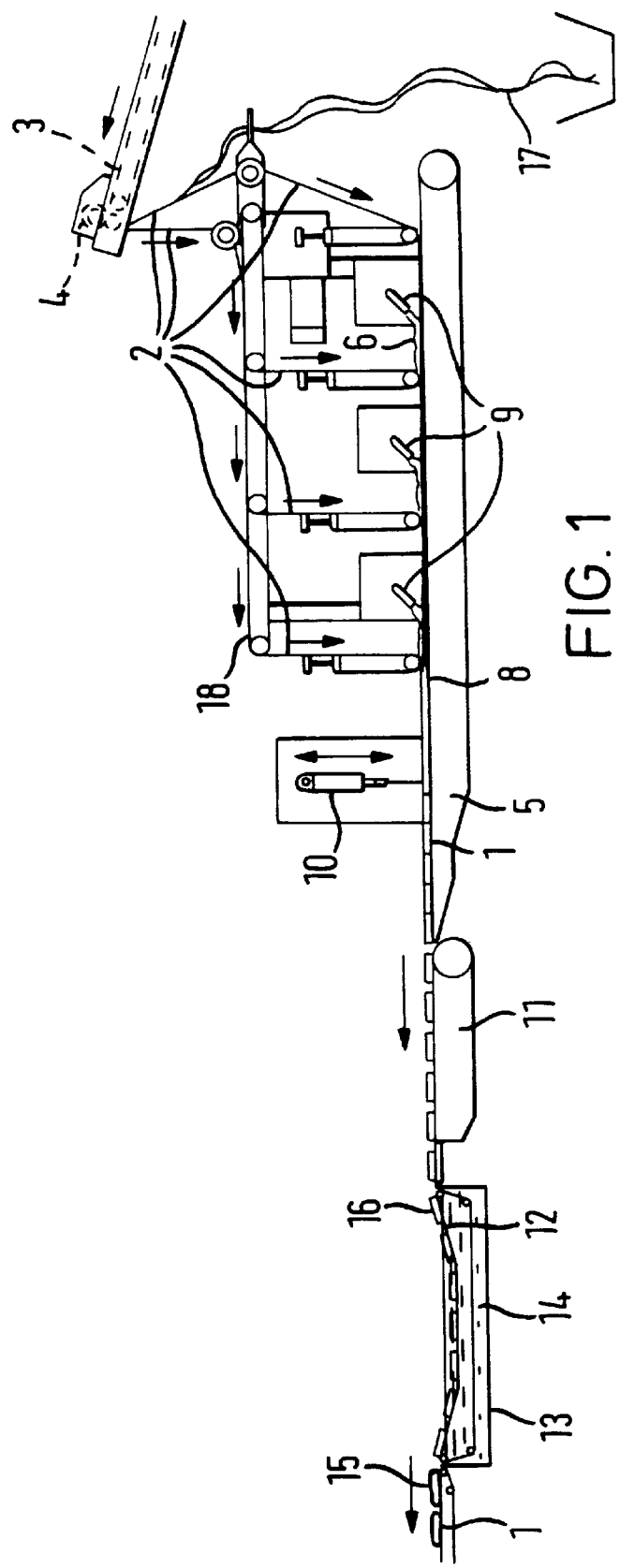
FIG. 1 is a side view principle drawing showing a production line for carrying out the steps of the method of producing lasagne according to the invention.
Figure 2:
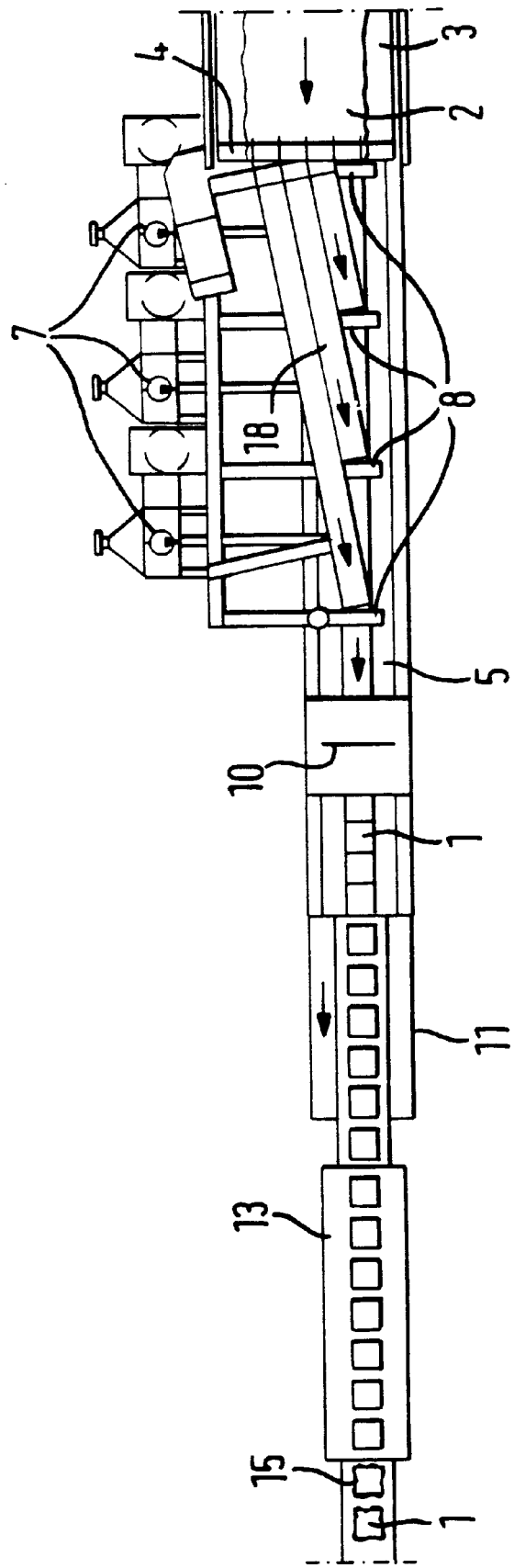
FIG. 2 is a top view of the same production line.

FIG. 1 and FIG. 2 show a line for producing a lasagne 1, according to the invention having three layers superposed. The lowermost pasta sheets are blanched in a continuous blancher not shown in the drawings and forwarded on a cooling belt conveyor 3. The pasta sheet 2 is cut into stripes with the width of the final lasagne portion 1 by rotating knives 4 removing surplus pasta 17. One of the pasta stripes is conveyed to a lower conveyor 5. A string of Bolognaise sauce 6 is extruded continuously lengthwise on the stripe by means of a filling nozzle 9 connected to filling pumps 7. The middle pasta stripe is conveyed via a cross conveyer 18 and onto the sauce while being passed over and under the calibrating rollers 8. On top of the middle pasta stripe another layer of sauce is extruded by a filling nozzle 6 which operates to superpose the filling sauce pasta stripe and covered with the top pasta stripe, which superposes the top pasta stripe on the filling and remainder of the product below. Also the middle and top pasta stripes are of the same width as the final lasagne portion 1. The lasagne are cut lengthwise, by means of a guillotine cutter 10 into desired portions which have sides which extend between a product bottom base surface provided by the bottom surface of the bottom pasts stripe, or sheet, layer and the opposing top surface, the surfaces extending, with respect to the vertical orientation, transversely.

The lasagne portions 1 are passed through a product handling zone 11 wherein they are spaced apart.

The portions 1 are passed on to a perforated conveyer 12 of a batter applicator 13 and the lasagne portion 1 are passed through a bath 14 of liquid coating base 15, in the present example through cheese sauce. While being passed through the bath 14 the lasagne portions 1 will be coated on the top surface and sides as well as on the base 16 due to the perforation in the conveyor 12 and because the portions will float slightly in the liquid coating base 15. Consequently, a coating of liquid coating base is provided substantially encapsulating the lasagne 1.

If desired, the top of the lasagne segment is browned by passing the portions beneath a heating or grill element, not shown in the drawings. The lasagne portions 1 are then transferred to a freezing unit. Particularly suitable for this purpose is a surface contact freezer which may provide at least a freezing of a lower part of the lasagne portions.

The frozen lasagne are packed individually in conventional packing material. As the lasagne are frozen no supporting wrapping is needed. For example, flexible pouches e.g. of plastic are suitable.

EXAMPLES

The pasta, Bolognese and cheese sauces are as described in the examples below.

Example 1—Pasta

A suitable pasta dough may, for example, comprise 70 to 80% flour, 15 to 20% whole egg by weight and water. The flour preferably being semolina flour.

The pasta dough is mixed and passed through a kneader and sheeter and calibrated, for example to a thickness of about 1.5 mm. The sheeted pasta is then preferably blanched.

Example 2—Cheese Sauce

Cheese sauce may be prepared from the following ingredients (by weight):

Fat 6 to 8%

Flour and starch 5 to 6%

Milk powder 7 to 9%

Cheese 4 to 8%

Salt, pepper, spices and water.

Example 3—Sauce Bolognese

Bolognese sauce may be prepared in a conventional way by cooking beef, onion, tomato pure, tomato, cheese, carrots, celeriac and herbs together.

Example 5—Cooking

A 600 grams block of frozen lasagne encapsulated in a liquid coating agent in accordance with the invention is provided.

A conventional 600 grams block of frozen lasagne without encapsulation is provided and has a base constituted by a pasta sheet.

The two lasagne portions are positioned in two similar baking trays and heated in a conventional oven at 225° C. for about 40 min. The two lasagne portions are removed from the trays. The one which is coated in accordance with the invention can easily be removed from the tray without leaving any pasta sticking to the tray. The non-encapsulated lasagne sticks to the tray surface and leave pieces of lasagne thereon. The texture of the lowermost sheet of pasta of the non-encapsulated lasagne is harder than that of the encapsulated lasagne.

What is claimed is:

1. In a process for preparing a lasagne product comprising steps of superposing a plurality of layers of pasta sheets and layers of a filling component wherein, with respect to a vertical orientation, the pasta sheets extend transversely and one pasta sheet defines a product base which comprises a product base surface and wherein the layers are superposed so that the filling layers are positioned between superposed pasta sheet layers to obtain a layered product comprising superposed pasta and filling component layers and so that the product base surface defines a surface which consists essentially of a pasta layer surface and wherein, thereafter, a step of segmenting the layered product into product portions defined by portion sides which comprise pasta sheet layer edges and which extend transversely with respect to and between the base surface and a portion surface which opposes the base surface and a step of packaging the product portions in a packing material wrapping, the improvements comprising:

subsequent to the segmenting of the layered product into the layered product segment portions, a step of applying an edible substance to the individual layered product segment portions to coat the portions separately so that the portions coated are individually encapsulated by the edible substance to obtain individual product segment portions encapsulated by the edible substance, wherein the edible substance has a Bostwick viscosity at 60 seconds and at 15° C. of less than 2 cgr and is one wherein upon heating the encapsulated product segment portions to cook the portions with the coated product base on a cooking surface, adherence of the product to the cooking surface is, as compared with like heating of a like product segment portion having an uncoated sheet on the cooking surface, reduced; and prior to any packaging step, freezing the encapsulated product segment portions to obtain frozen portions and then packaging the frozen portions.

2. A process according to claim 1 wherein the product segment portions are frozen so that no packing material wrapping for providing support to the encapsulated product base is needed for supporting the encapsulated product portions.

3. A process according to claim 1 wherein the frozen portions are packaged in a package without a packing material wrapping for supporting the encapsulated product base for supporting the encapsulated product portions.

4. A process according to claim 1 wherein the edible substance is applied by a method selected from the group consisting of immersing the layered product segment portions in the edible substance and by spraying the edible substance on the layered product segment portions and of a combination thereof.

5. A process according to claim 1 further comprising, subsequent to the segmenting into the layered product segment portions and prior to applying the edible substance to the layered product segment portions, freezing the layered product segment portions to obtain frozen segment portions and then, applying the edible substance to the frozen segment portions to obtain the encapsulated product segment portions and then freezing the encapsulated product segment portions.

6. A process according to claim 5 wherein the product segment portions are frozen so that no packing material wrapping for providing support to the encapsulated product base is needed for supporting the encapsulated product portions.

7. A process according to claim 5 wherein the frozen portions are packaged in a package without a packaging material wrapping for supporting the encapsulated product base for supporting the encapsulated product portions.

8. A process according to claim 5 wherein the edible substance is applied by a method selected from the group consisting of immersing the layered product segment portions in the edible substance and by spraying the edible substance on the layered product segment portions and of a combination thereof.

9. A process according to claim 1 wherein the pasta sheets are blanched pasta sheets.

10. A process according to claim 1 further comprising, prior to applying the edible substance, dusting the product segment portions with a substance selected from the group consisting of a flour and bread crumbs.

11. A process according to claim 1 wherein the edible substance has a Bostwick viscosity at 60 seconds and at 60° C. of 10 cgr.

12. A process according to claim 1 or 11 wherein the edible substance is a sauce.

13. A process according to claim 1 or 11 wherein the edible substance is a cheese sauce.

14. A process according to claim 1 wherein the edible substance is a sauce and the sauce comprises a milk component.

15. A process according to claim 1 wherein the edible substance is a sauce selected from the group consisting of a cheese sauce and a béchamel sauce.

16. A process according to claim 1 wherein the sauce is a tomato sauce.

17. A process according to claim 1 wherein the edible substance is applied so that the encapsulated product segment portions comprise the substance in an amount of from 10% to 40% substance by weight.

18. A process according to claim 5 wherein the edible substance is applied so that the encapsulated product segment portions comprise the substance in an amount of from 10% to 40% substance by weight.

19. The packaged frozen product of the process of claim 1 or 5.

20. The packaged frozen product of the process of claim 11.

21. Frozen pasta product composition portions packaged in a packing material wherein each composition portion comprises (i) superposed layers which comprise three pasta sheet layers and filling layers between the sheet layers wherein edges of the sheets define pasta product portion sides between two opposing pasta product portion surfaces, wherein at least one of the opposing surfaces is a pasta layer sheet surface, and (ii) an edible substance which coats the opposing surfaces and sides so that the pasta product portion is encapsulated by the edible substance, and wherein each composition portion has a weight of from 20 grams to 80 grams and wherein the edible substance has a Bostwick viscosity at 60 seconds at 15° C. of less than 2 cgr and is one wherein upon heating a composition portion to cook the composition portion with the coated sheet surface on a cooking surface, adherence of the composition portion to the cooking surface is, as compared with like heating of a like product portion having an uncoated sheet on the cooking surface, reduced and wherein the portions are packaged in a package without a packing material wrapping which wraps each portion for supporting a portion surface so that each encapsulated portion is supported by packing material wrapping.

22. A pasta composition according to claim 21 wherein the composition has a weight of from 40 grams to 60 grams and wherein the coating which encapsulates the product segment is in an amount of from 10% to 40% coating by weight.

23. A pasta composition according to claim 21 wherein the composition has a weight of from 40 grams to 60 grams and wherein the coating which encapsulates the product segment is in an amount of from 20% to 40% coating by weight.

24. A pasta composition according to claim 21 wherein the edible substance is a sauce.

25. A pasta composition according to claim 24 wherein the sauce comprises a milk component.

26. A pasta composition according to claim 24 wherein the sauce is selected from the group consisting of a cheese sauce, béchamel sauce and a tomato sauce.

* * * * *